US009127612B2

(12) United States Patent
Nakata et al.

(10) Patent No.: US 9,127,612 B2
(45) Date of Patent: Sep. 8, 2015

(54) FUEL-INJECTION-CHARACTERISTICS LEARNING APPARATUS

(75) Inventors: Kenichiro Nakata, Okazaki (JP); Koji Ishizuka, Chiga-gun (JP)

(73) Assignee: DENSO CORPORATION, Kariya (JP)

( * ) Notice: Subject to any disclaimer, the term of this patent is extended or adjusted under 35 U.S.C. 154(b) by 581 days.

(21) Appl. No.: 13/325,531

(22) Filed: Dec. 14, 2011

(65) Prior Publication Data

US 2012/0158268 A1 Jun. 21, 2012

(30) Foreign Application Priority Data

Dec. 15, 2010 (JP) ................................ 2010-279476

(51) Int. Cl.
*B60T 7/12* (2006.01)
*G05D 1/00* (2006.01)
(Continued)

(52) U.S. Cl.
CPC ........ *F02D 41/2467* (2013.01); *F02D 41/2451* (2013.01); *F02D 41/2461* (2013.01);
(Continued)

(58) Field of Classification Search
CPC ........... F02D 41/2454; F02D 41/1401; F02D 2041/1409; F02D 41/1403; F02D 2041/1432; F02D 41/1402; F02D 2041/1418; F02D 41/1422; F02D 2041/1431; F02D 41/2403; F02D 41/2406; F02D 41/3432; F02D 2041/142; F02D 41/2451; F02D 2041/1423; F02D 11/105; F02D 41/2438; F02D 41/2441; F02D 41/1446; F02D 41/182; F02D 41/2422; F02D 41/2467; F02D 41/2429; F02D 41/2461; F02D 41/2464
USPC ............... 701/101–107, 115, 35.12; 123/305, 123/480, 478, 673, 674, 490, 494, 479, 486, 123/585.1, 456, 472, 488, 457, 510, 511; 73/114.51, 114.43; 239/104, 105, 107, 239/115, 103, 585.1
See application file for complete search history.

(56) References Cited

U.S. PATENT DOCUMENTS 4,402,294 A * 9/1983 McHugh et al. .............. 123/480
4,567,869 A * 2/1986 Peter et al. ............... 123/339.21
(Continued)

FOREIGN PATENT DOCUMENTS

JP 2003-120393 4/2003
JP 2008-297935 12/2008
(Continued)

OTHER PUBLICATIONS

Japanese Official Action dated Oct. 16, 2012 issued in corresponding Japanese Application No. 2010-279476, with English translation.
(Continued)

*Primary Examiner* — Stephen K Cronin
*Assistant Examiner* — Brian Kirby
(74) *Attorney, Agent, or Firm* — Nixon & Vanderhye PC

(57) ABSTRACT

A characteristics-detecting-portion analyzes a fuel injection condition based on a fuel pressure waveform which represents a variation in a detection value of the fuel pressure sensor and then detects the fuel-injection-characteristic value based on the analyzed fuel injection condition. The detected parameter is learned and stored in a memory in association with a fuel temperature detected by a fuel temperature sensor. A fuel-injection-rate model is established based on the learned detected parameters. A command-fuel-injection start time and a command-fuel-injection period are defined by use of the fuel-injection-rate model and the current fuel temperature.

3 Claims, 6 Drawing Sheets

(51) Int. Cl.

| | |
|---|---|
| ***G06F 7/00*** | (2006.01) |
| ***G06F 17/00*** | (2006.01) |
| ***G06F 19/00*** | (2011.01) |
| ***F02D 41/24*** | (2006.01) |

(52) U.S. Cl.

CPC ........ *F02D41/2464* (2013.01); *F02D 41/2429* (2013.01); *F02D 41/2438* (2013.01); *F02D 2200/0602* (2013.01); *F02D 2200/0606* (2013.01)

(56) References Cited

U.S. PATENT DOCUMENTS

| | | | | |
|---|---|---|---|---|
| 4,571,683 | A * | 2/1986 | Kobayashi et al. | 701/106 |
| 4,593,666 | A * | 6/1986 | Lefevre et al. | 123/674 |
| 4,599,981 | A * | 7/1986 | Miyano et al. | 123/361 |
| 4,672,934 | A * | 6/1987 | Peter et al. | 123/339.21 |
| 5,293,852 | A * | 3/1994 | Lehner et al. | 123/339.18 |
| 5,444,627 | A * | 8/1995 | Sandborg et al. | 701/103 |
| 5,865,158 | A * | 2/1999 | Cleveland et al. | 123/478 |
| 6,085,142 | A * | 7/2000 | Di Leo et al. | 701/104 |
| 6,283,106 | B1 * | 9/2001 | Kadowaki et al. | 123/674 |
| 6,415,779 | B1 * | 7/2002 | Colomby | 123/674 |
| 6,516,658 | B1 * | 2/2003 | McCoy et al. | 73/114.45 |
| 6,561,164 | B1 * | 5/2003 | Mollin | 123/446 |
| 6,879,903 | B2 * | 4/2005 | Jaliwala et al. | 701/104 |
| 6,988,030 | B2 * | 1/2006 | Asano et al. | 701/103 |
| 7,082,928 | B2 * | 8/2006 | Fritsch et al. | 123/478 |
| 7,139,657 | B2 * | 11/2006 | Bouchain et al. | 701/104 |
| 7,219,005 | B2 * | 5/2007 | Mazet | 701/104 |
| 7,293,555 | B2 * | 11/2007 | Kato et al. | 123/679 |
| 7,305,972 | B2 * | 12/2007 | Kloos et al. | 123/479 |
| 7,343,240 | B2 * | 3/2008 | Sugiyama et al. | 701/104 |
| 7,422,004 | B2 * | 9/2008 | Akihisa et al. | 123/478 |
| 7,578,288 | B2 * | 8/2009 | Thiel et al. | 123/690 |
| 7,599,784 | B2 * | 10/2009 | Ishizuka et al. | 701/104 |
| 7,628,146 | B2 * | 12/2009 | Kloppenburg et al. | 123/673 |
| 7,721,711 | B2 * | 5/2010 | Kurosawa et al. | 123/434 |
| 7,765,995 | B2 * | 8/2010 | Nakata et al. | 123/673 |
| 7,840,335 | B2 * | 11/2010 | Akihisa et al. | 701/104 |
| 7,865,293 | B2 * | 1/2011 | Ishizuka et al. | 701/104 |
| 7,899,603 | B2 * | 3/2011 | Yamamoto et al. | 701/104 |
| 7,930,090 | B2 * | 4/2011 | Weiss et al. | 701/105 |
| 8,014,932 | B2 | 9/2011 | Nakata et al. | |
| 8,539,935 | B2 * | 9/2013 | Nakata et al. | 123/480 |
| 8,676,476 | B2 * | 3/2014 | Malikopoulos | 701/106 |
| 8,775,058 | B2 * | 7/2014 | Hauser | 701/115 |
| 9,002,621 | B2 * | 4/2015 | Hauser | 701/104 |
| 2004/0128055 | A1 * | 7/2004 | Jaliwala et al. | 701/104 |
| 2009/0056676 | A1 | 3/2009 | Nakata et al. | |
| 2009/0056678 | A1 | 3/2009 | Nakata et al. | |
| 2009/0063013 | A1 | 3/2009 | Nakata et al. | |
| 2010/0017100 | A1 * | 1/2010 | Yamamoto et al. | 701/104 |
| 2010/0036593 | A1 * | 2/2010 | Annoura | 701/115 |
| 2010/0319443 | A1 * | 12/2010 | Nakata et al. | 73/114.45 |
| 2011/0202255 | A1 * | 8/2011 | Hauser | 701/103 |
| 2012/0158268 | A1 * | 6/2012 | Nakata et al. | 701/103 |

FOREIGN PATENT DOCUMENTS

| | | | | | |
|---|---|---|---|---|---|
| JP | 2009057928 | | * | 3/2009 | F02D 41/2467 |
| JP | 2010101245 | A | * | 5/2010 | |
| JP | 2010-180824 | | | 8/2010 | |
| JP | 2010180824 | A | * | 8/2010 | |

OTHER PUBLICATIONS

Office Action (7 pages) dated Dec. 2, 2013, issued in corresponding Chinese Application No. 201110419894.4 and English translation (9 pages).

* cited by examiner

FUEL-INJECTION-CHARACTERISTICS LEARNING APPARATUS

CROSS-REFERENCE TO RELATED APPLICATION

This application is based on Japanese Patent Application No. 2010-279476 filed on Dec. 15, 2010, the disclosure of which is incorporated herein by reference.

FIELD OF THE INVENTION

The present invention relates to a fuel-injection-characteristics learning apparatus which learns a fuel-injection-characteristic value, such as fuel-injection-start time delay "Td", which a fuel injector individually has.

BACKGROUND OF THE INVENTION

When a fuel injector injects fuel into a combustion chamber of an internal combustion engine, there is a time delay from when a fuel-injection command signal is transmitted until when the fuel is actually injected. Each fuel injector has an individual variation in a correlation between an output period of the fuel-injection command signal and the fuel injection quantity. The time delay and the fuel injection correlation are previously obtained by experiments and are stored in a memory as a fuel-injection-characteristic value. After the fuel injector is shipped, based on the stored fuel-injection-characteristic value, the fuel-injection command signal is established.

JP-2009-74535A (US-2009-0056678A1) and JP-2009-57926A (US-2009-0056676A1) show that a fuel pressure sensor is provided to a fuel injector in order to detect a variation in fuel pressure (fuel pressure waveform). Based on this variation in fuel pressure, a variation in fuel-injection-rate (fuel injection condition) is analyzed. For example, when a fuel injection is started, the fuel pressure waveform starts to descend due to the fuel injection. Thus, based on a time when the fuel pressure waveform starts to descend, the fuel-injection-start time can be computed (analyzed).

According to above, even after the fuel injector is shipped, the actual fuel injection condition can be analyzed so that the fuel-injection-characteristic value can be detected. Even if the fuel-injection-characteristic value is varied due to an aging deterioration, the fuel-injection-characteristic value can be learned so that the fuel injection condition can be controlled with high accuracy.

Meanwhile, the fuel-injection-characteristic value depends on a fuel temperature. If the fuel-injection-characteristic value is learned without respect to the fuel temperature and the fuel-injection command signal is established, the fuel injection condition can not be accurately controlled. The present inventors have found out such problems.

SUMMARY OF THE INVENTION

The present invention is made in view of the above matters, and it is an object of the present invention to provide a fuel-injection-characteristics learning apparatus which enables to control a fuel injection condition with high accuracy.

According to the present invention, a fuel-injection-characteristics learning apparatus learns a fuel-injection-characteristic value of a fuel injection system. The fuel injection system includes: a fuel injector injecting the high-pressure fuel accumulated in the accumulator through a fuel injection port; a memory portion storing a fuel-injection-characteristic value which the fuel injector individually has; and a fuel injection command portion generating a fuel-injection command signal based on the fuel-injection-characteristic value.

The fuel-injection-characteristics learning apparatus includes a fuel pressure sensor provided in a fuel passage fluidly connecting the accumulator and the fuel injection port. This fuel pressure sensor detects a fuel pressure in the fuel passage. Further the learning apparatus includes: a characteristic-value detecting portion which analyzes a fuel injection condition based on a fuel pressure waveform which represents a variation in a detection value of the fuel pressure sensor and detects the fuel-injection-characteristic value based on the analyzed fuel injection condition; a fuel temperature sensor which detects a fuel temperature; and a learning portion which stores the fuel-injection-characteristic value in the memory portion in association with the fuel temperature detected by the fuel temperature sensor.

According to the present embodiment, since the fuel-injection-characteristic value is stored in association with the fuel temperature, the fuel-injection command signal can be established based on the fuel-injection-characteristic value corresponding to the actual fuel temperature, whereby the fuel injection condition can be controlled with high accuracy.

The fuel-injection-characteristic value includes following values:

(a) A fuel-injection-start time delay from when a fuel injection command is generated until when the fuel injection is actually started;

(b) A fuel-injection-end time delay from when a command for terminating the fuel injection is generated until when the fuel injection is actually terminated;

(c) An injection-rate ascending-speed (or a fuel pressure descending-speed);

(d) An injection-rate descending-speed (or a fuel pressure ascending-speed);

(e) A maximum fuel-injection-rate (or its fuel pressure drop quantity); and (f) A characteristic value indicating a correlation between a command fuel injection period and an actual fuel injection quantity.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Hereinafter, an embodiment that embodies the present invention will be described with reference to the drawings.

The fuel-injection characteristic learning apparatus is mounted to an internal combustion engine (diesel engine) having four cylinders #1-#4.

Figure 1:
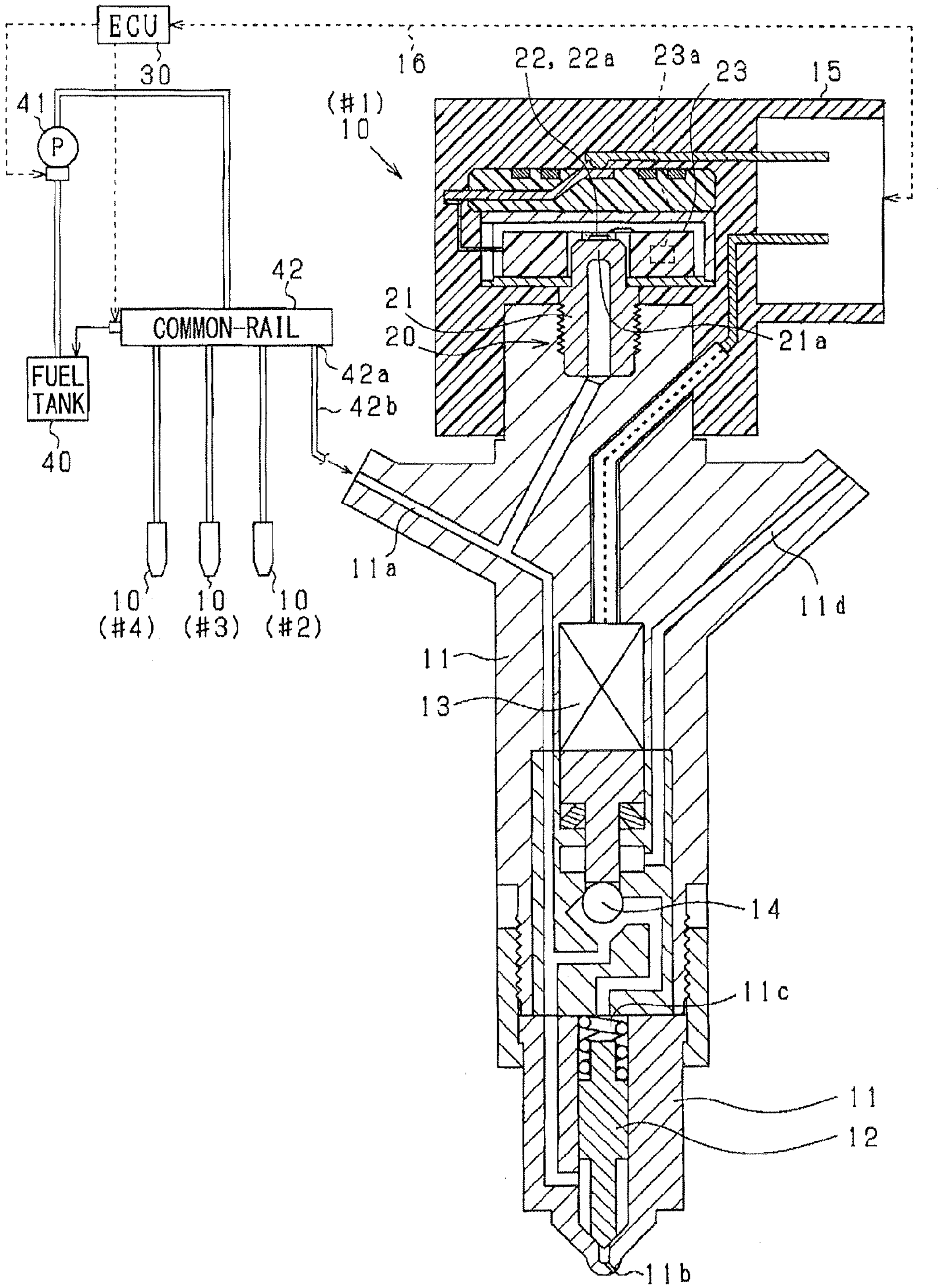
FIG. 1 is a construction diagram showing an outline of a fuel injection system on which a fuel-injection-characteristics learning apparatus is mounted, according to an embodiment of the present invention.

FIG. 1 is a schematic view showing fuel injectors 10 provided to each cylinder, a fuel pressure sensor 20 provided to each fuel injectors 10, an electronic control unit (ECU) 30 and the like.

First, a fuel injection system of the engine including the fuel injectors 10 will be explained. A fuel in a fuel tank 40 is pumped up by a high-pressure pump 41 and is accumulated in a common-rail (accumulator) 42 to be supplied to each fuel injector 10 (#1-#4) through a high-pressure pipe 42*b*. The fuel injectors 10 (#1-#4) perform fuel injection sequentially in a predetermined order. The high-pressure pump 41 is a plunger pump which intermittently discharges high-pressure fuel.

At a connecting portion between the common-rail 42 and the high-pressure pipe 42*b*, an orifice (a throttle portion of the high-pressure pipe 42*b*) is provided to reduce fuel pulsation which is propagated to the common-rail 42 through the high-pressure fuel pipe 42*b*. Thus, the fuel pulsation in the common-rail 42 is reduced so that fuel can be supplied to each fuel injector 10 under stable pressure.

The fuel injector 10 is comprised of a body 11, a needle valve body 12, an actuator 13 and the like. The body 11 defines a high-pressure passage 11*a* and an injection port 11*b*. The needle valve body 12 is accommodated in the body 11 to open/close the injection port 11*b*.

The body 11 defines a backpressure chamber 11*c* with which the high pressure passage 11*a* and a low pressure passage 11*d* communicate. A control valve 14 switches between the high pressure passage 11*a* and the low pressure passage 11*d*, so that the high pressure passage 11*a* communicates with the backpressure chamber 11*c* or the low pressure passage 11*d* communicates with the backpressure chamber 11*c*. When the actuator 13 is energized and the control valve 14 moves downward in FIG. 1, the backpressure chamber 11*c* communicates with the low pressure passage 11*d*, so that the fuel pressure in the backpressure chamber 11*c* is decreased. Consequently, the back pressure applied to the valve body 12 is decreased so that the valve body 12 is opened. Meanwhile, when the actuator 13 is deenergized and the control valve 14 moves upward, the backpressure chamber 11*c* communicates with the high pressure passage 11*a*, so that the fuel pressure in the backpressure chamber 11*c* is increased. Consequently, the back pressure applied to the valve body 12 is increased so that the valve body 12 is closed.

The ECU 30 controls the actuator 13 to drive the valve body 12. When the needle valve body 12 opens the injection port 11*b*, high-pressure fuel in the high pressure passage 11*a* is injected to a combustion chamber (not shown) of the engine through the injection port 11*b*.

A structure of the fuel pressure sensor 20 will be described hereinafter. The fuel pressure sensor 20 includes a stem 21 (load cell), a pressure sensor element 22, a fuel temperature sensor 22*a* and a molded IC 23.

The stem 21 is provided to the body 11. The stem 21 has a diaphragm 21*a* which elastically deforms in response to high fuel pressure in the high-pressure passage 11*a*. The pressure sensor element 22 is disposed on the diaphragm 21*a* to output a pressure detection signal depending on an elastic deformation of the diaphragm 21*a*. The fuel temperature sensor 22*a* is also disposed on the diaphragm 21*a* to detect a temperature of the diaphragm 21*a* as the fuel temperature.

The molded IC 23 includes an amplifier circuit which amplifies detection signals transmitted from the pressure sensor element 22 and the fuel temperature sensor 22*a*. Further, the molded IC 23 has a transmitting circuit which transmits the detection signals and a memory 23*a* which stores the fuel-injection-characteristic value. The molded IC is mounted to the fuel injector 10 with the stem 21. The memory 23*a* is a nonvolatile memory, such as an EEPROM.

A connector 15 is provided on the body 11. The molded IC 23, the actuator 13 and the ECU 30 are electrically connected to each other through a harness 16 connected to the connector 15. The amplified detection signal is transmitted to the ECU 30. Such a signal communication processing is executed with respect to each cylinder.

The ECU 30 receives detection signals from various sensors. Based on these detection signals, each component of the fuel supply system is controlled. The ECU 30 is constructed of a well-known microcomputer. The ECU detects the operating state of the engine and user's request on the basis of the detection signals of various sensors and operates various actuators, such as a suction control valve and a fuel injector 10.

The microcomputer mounted in the ECU 30 is basically constructed of various computing devices, storage devices, signal processing devices, communication devices and a power source circuit. Specifically, the microcomputer includes: a central processing unit (CPU) for performing various computations; a Random Access Memory (RAM) as a main memory for temporarily storing data and operation results; a Read Only Memory (ROM) as a program memory; an electrically writable non-volatile memory (EEPROM) as a data storage memory (backup memory); a backup RAM (RAM to which electric power is supplied from a backup power source such as a vehicle-mounted battery); an A-D converter, a clock, and input/output ports for inputting/outputting signals. The ROM stores a various kind of programs for controlling the engine. The programs include programs regarding the fuel-injection-characteristics and an injection command correction. The EEPROM stores a various kind of data such as design date of the engine.

Figure 2:
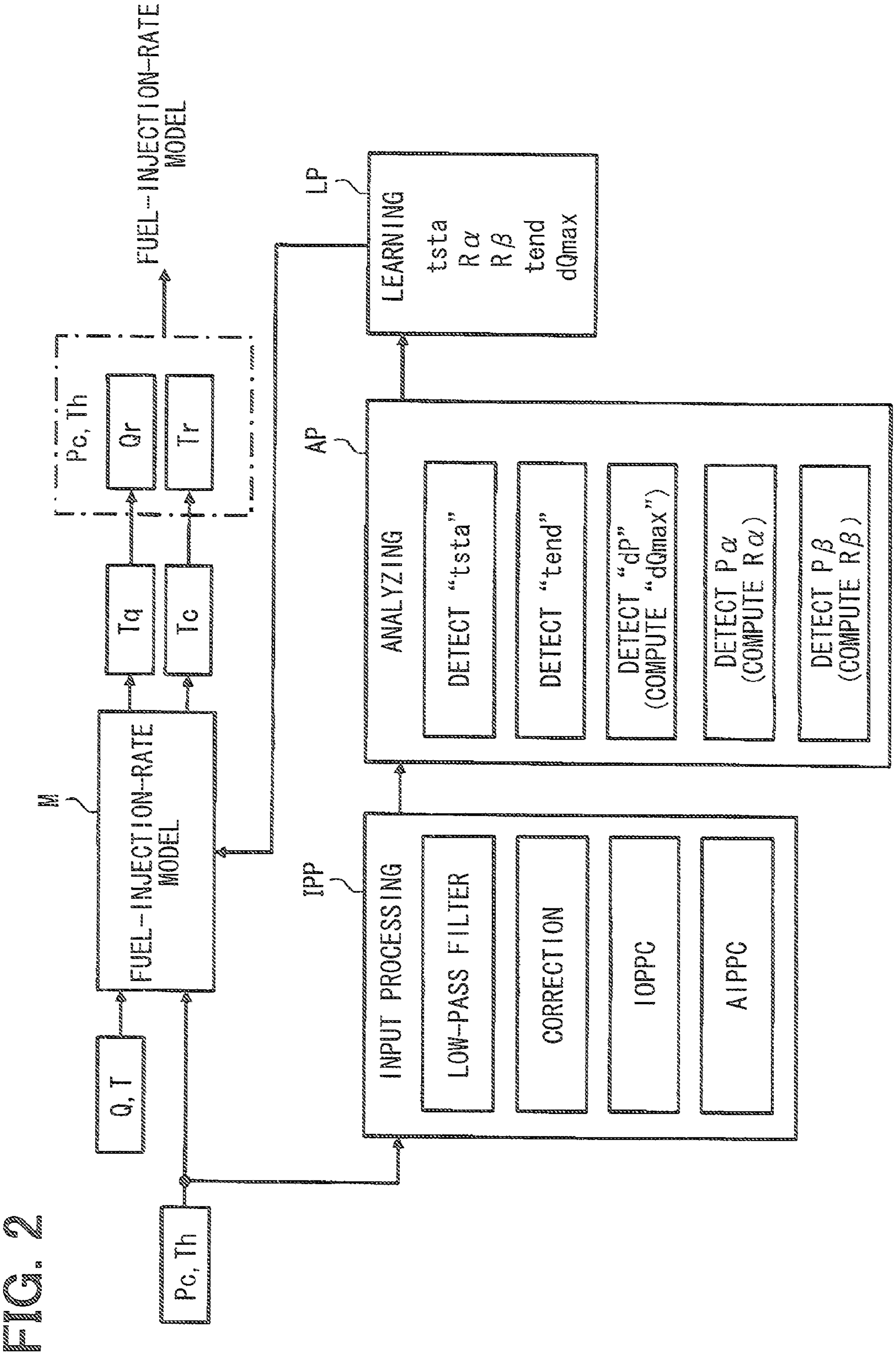
FIG. 2 is a functional block diagram of an ECU.

As shown in FIG. 2, based on the outputs from the sensors, the ECU 30 (injection command portion) computes a torque (required torque) which should be generated on an output shaft (a crank shaft), a required fuel injection quantity "Q" and a required fuel-injection-start time "T" for obtaining the required torque. For example, an actual pressure "Pc" in the high-pressure passage 11*a* is detected by the fuel pressure sensor 20, and an actual fuel temperature "Th" in the high-pressure passage 11*a* is detected by the fuel temperature sensor 22*a*. The ECU 30 computes the required fuel injection quantity "Q" and the required fuel-injection-start time "T" according to a driving condition of an engine and an accelerator position.

The memory of the ECU 30 stores a fuel-injection-rate model which represents a variation in the fuel-injection-rate when a fuel-injection command signal is outputted in a specific fuel injection condition (actual pressure "Pc" and actual temperature "Th"). The fuel-injection command signal indicates a command injection period "Tq" and command injection-start time "Tc ". In other words, the command injection period "Tq", the command injection-start time "Tc", the actual pressure "Pc" and the actual temperature "Th" are inputted into the fuel-injection-rate model as input parameters, whereby the actual fuel-injection-start time "Tr" and the actual fuel injection quantity "Qr" are outputted as output parameters.

By means of this fuel-injection-rate model, the ECU 30 computes the command injection period "Tq" and the command injection-start time "Tc" corresponding to the required fuel injection quantity "Q" and the required fuel-injection-start time "T" based on the actual fuel pressure "Pc" (for example, fuel pressure "P0" in FIG. 3C) and the actual fuel temperature "Th". Consequently, based on the command injection period "Tq" and the command injection-start time "Tc", a fuel injection is conducted by the fuel injector 10 so that an output torque of the engine is adjusted to a target value and emission quantity of particulate matters, NOx and the like can be reduced. While the ECU 30 transmits the fuel-injection command signal to the fuel injector 10, the actuator 13 is energized. Thus, the time when the fuel-injection command signal is outputted corresponds to the command injection-start time "Tc", and the time period during which the fuel-injection command signal is outputted corresponds to the command injection period "Tq".

Referring to FIGS. 3A to 3D, a correlation between a variation in the actual fuel pressure "Pc" detected by the fuel pressure sensor 20 and a variation in fuel-injection-rate will be described hereinafter. The variation in the actual fuel pressure is illustrated by a fuel pressure waveform and the variation in the fuel-injection-rate is illustrated by an injection rate waveform.

Figure 3A:
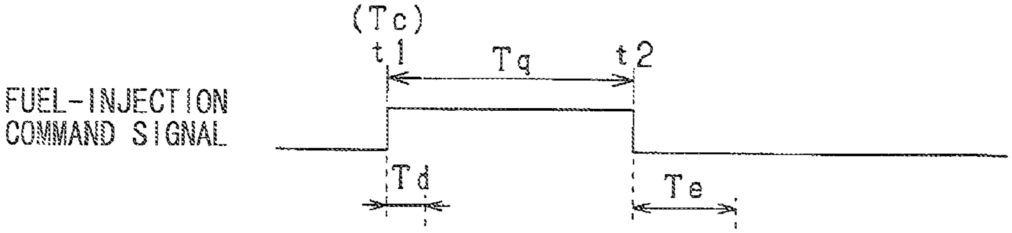
FIGS. 3A, 3B, 3C, and 3D are charts for explaining a correlation between a fuel pressure waveform and a fuel-injection-rate waveform.

FIG. 3A shows a fuel-injection command signal which the ECU 30 provides to the actuator 13. Based on this fuel-injection command signal, the actuator 13 operates to open the injection port 11*b*. That is, a fuel injection is started at a pulse-on timing "t1 (Tc)" of the fuel-injection command signal, and the fuel injection is terminated at a pulse-off timing "t2" of the fuel-injection command signal. During the command injection period "Tq" from the timing "t1" to the timing "t2", the injection port 11*b* is opened. By controlling the command injection period "Tq", the fuel injection quantity "Q" is controlled.

Figure 3B:
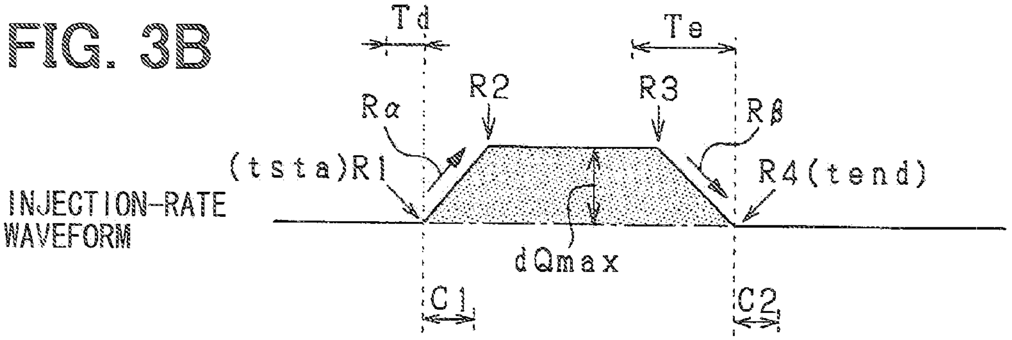
Figure 3C:
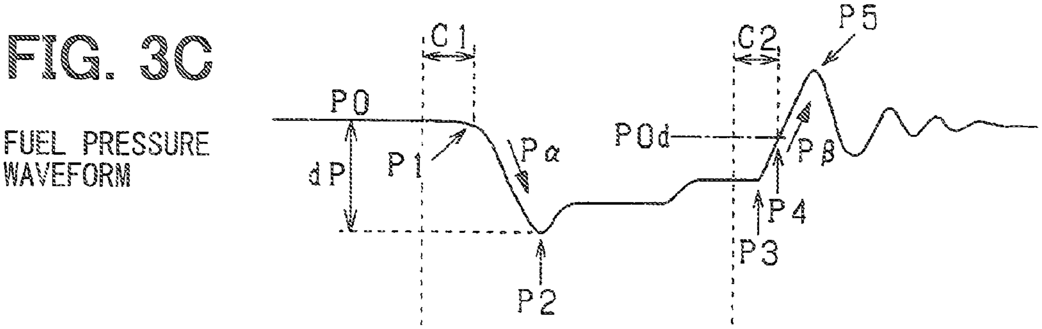

FIG. 3B shows an injection-rate waveform representing a variation in fuel-injection-rate, and FIG. 3C shows a fuel pressure waveform representing a variation in fuel pressure detected by the fuel pressure sensor 20. The fuel pressure waveform shown in FIG. 3C is obtained by successively sampling the detection value of the fuel pressure sensor 20 at specified time intervals. This fuel pressure waveform represents a variation in fuel pressure in the high-pressure passage 11*a* during a fuel injection. The sampling period is set shorter than the actual fuel injection period.

Since the pressure waveform and the injection-rate waveform have a correlation which will be described below, the injection-rate waveform can be estimated from the detected pressure waveform. That is, as shown in FIG. 3A, after the fuel-injection command signal rises at the timing "t1", the fuel injection is started and the injection rate starts to increase at a timing "R1(tsta)". When a delay time "C1" has elapsed after the timing "R1", the detection pressure starts to decrease at a point "P1". Then, when the injection rate reaches the maximum injection rate at a timing "R2", the detection pressure drop is stopped at a point "P2". When the injection rate starts to decrease at a timing "R3", the detection pressure starts to increase at the point "P3". After that, when the injection rate becomes zero and the actual fuel injection is terminated at a timing "R4(tend)", the increase in the detection pressure is stopped at the point "P5".

As explained above, the pressure waveform and the injection-rate waveform has a high correlation. Since the injection-rate waveform represents the fuel-injection-start timing (R1), the fuel-injection-end timing (R4) and the fuel injection quantity (area of shade portion in FIG. 2B), the fuel injection condition can be analyzed by estimating the injection-rate waveform from the pressure waveform.

In the fuel pressure waveform, a descending-speed Pα has a high correlation with an ascending-speed Pβ. Based on the descending-speed Pα and the ascending-speed Pβ, an injection-rate ascending-speed Rα and an injection-rate descending speed Rβ are computed. The pressure at the point "P1" is defined as a reference pressure "P0". A pressure drop quantity "dP" from the reference pressure "P0" is detected and a maximum fuel-injection-rate "dQmax" is computed based on the pressure drop quantity "dP". After a fuel injection is conducted, the pressure "P0" becomes lower than the reference pressure "P0" by a pressure corresponding to the fuel injection quantity. The fuel-injection-end timing "tend" is computed based on the timing at which the fuel pressure reaches the pressure "P0*d*" at the point "P4". Then, the computer computes the fuel-injection-start time delay "Td" between the command-injection-start timing "Tc" and the fuel-injection-start timing "tsta", and the fuel-injection-end time delay "Te" between the command-injection-end timing "t2" and the fuel-injection-end timing "tend".

The fuel-injection-start time delay "Td", the fuel-injection-end timing "tend", the injection-rate ascending-speed Rα, the injection-rate descending speed Rβ, and the maximum fuel-injection-rate "dQmax" are detection parameters which are obtained by analyzing the variation in the actual fuel pressure "Pc". These parameters are used for identifying various formulas which configure the injection rate model M. Moreover, in the present embodiment, these detection parameters are detected in association with the fuel temperature.

Referring to FIG. 2, a processing for configuring the fuel-injection-rate model M will be described hereinafter.

An input processing portion "IPP" executes a filtering in which the fuel pressure waveform, which indicates a variation in detection value (actual fuel pressure "Pc") of the fuel pressure sensor 20, is filtrated by a low-pass filter to remove high-frequency noises therefrom. Then, pressure increase components due to the high-pressure pump 41 are removed from the filtrated fuel pressure waveform, which is referred to as no-injection cylinder correction. Specifically, while a fuel injection is conducted in a specified cylinder, a pressure increase in another cylinder where no fuel injection is conducted is subtracted from the fuel pressure in the specified cylinder. The input processing portion "IPP" removes a pressure pulsation, which is generated due to a fuel injection start (an opening of fuel injection port 11*b*), from the fuel pressure waveform. This is referred to as an injector-opening pressure pulsation compensation (IOPPC). Further, in a case that multiple fuel injections are conducted in a single power stroke, the pressure pulsation due to anterior injections is removed from the fuel pressure waveform, which is referred to as anterior-injection pressure pulsation compensation (AIPPC).

An analyzing portion "AP" analyzes the fuel pressure waveform to obtain the fuel-injection-start time "tsta", the fuel-injection-end timing "tend", the injection-rate ascending-speed Rα, the injection-rate descending speed Rβ, and the maximum fuel-injection-rate "dQmax". Further, the analyzing portion "AP" computes detection parameters (fuel-injection characteristics) of the fuel-injection-start time delay "Td", the fuel-injection-end timing "tend" and the like.

More specifically, the analyzing portion "AP" computes a first-order differentiation value and a second-order differentiation value at each time point with respect to the above transition in fuel pressure. When the second-order differentiation value is smaller than a threshold K, which is negative value, the current time point is detected as the pressure drop start timing on the fuel pressure waveform. From when a fuel injection is started until when the fuel pressure waveform starts to descend, there is a time delay "C1" in which the fuel pressure pulsation generated in the fuel injection port 11*b* is propagated to the fuel pressure sensor 20. Therefore, the time point which is earlier than the pressure drop start timing by the time delay "C1" is detected as the fuel-injection-start timing "tsta".

Further, when a previous value of the first-order differentiation value is positive value and a present first-order differentiation value is smaller than the threshold of negative value, the analyzing portion "AP" defines the present time as the pressure-ascending end timing. From when a fuel injection is terminated until when the fuel pressure waveform stops to ascend, there is a time delay "C2" in which the fuel pressure pulsation generated in the fuel injection port 11*b* is propagated to the fuel pressure sensor 20. Therefore, the time point which is earlier than the pressure-increase end timing by the time delay "C2" is detected as the fuel-injection-end timing "tend".

The analyzing portion "AP" detects the fuel pressure descending-speed Pα which corresponds to an inclination of the pressure waveform at which the fuel pressure is decreasing along with an increase in fuel-injection-rate. Further, the analyzing portion "AP" detects the fuel pressure ascending-speed Pβ which corresponds to an inclination of the pressure waveform at which the fuel pressure is ascending along with a decrease in fuel-injection-rate. The fuel pressure descending-speed Pα and the injection-rate ascending-speed Rα have high correlation. The fuel pressure ascending-speed Pβ and the injection-rate descending speed Rβ have high correlation. In view of this, the detected fuel pressure descending-speed Pα is multiplied by a correlation coefficient αto compute the injection-rate ascending-speed Rα. The detected fuel pressure ascending-speed Pβ is multiplied by a correlation coefficient β to compute the injection-rate descending-speed Rβ.

The analyzing portion "AP" detects the pressure drop quantity "dP" on the fuel pressure waveform, which is generated due to the fuel injection. The pressure drop quantity "dP" and the maximum injection rate "dQmax" have high correlation. In view of this, the detected pressure drop quantity "dP" is multiplied by a correlation coefficient γ to compute the maximum injection rate "dQmax".

A learning portion "L" learns and stores the fuel-injection-start time "tsta", the fuel-injection-end timing "tend", the injection-rate ascending-speed R.alpha., the injection-rate descending speed R.beta., the maximum fuel-injection-rate "dQmax", and the fuel-injection-start time delay "Td". Then, based on these learning values, a variation in relative injection rate (relative injection rate waveform) is obtained. This relative injection rate corresponds to the fuel-injection-rate and varies according to a variation in actual fuel pressure "Pc" detected by the fuel pressure sensor 20. Further, the learning portion "L" converts the relative injection rate into the actual injection rate based on an injection-rate model learning, which will be described later, and learns (stores) the maximum injection rate "dQmax" . The actual injection rate and the maximum injection rate "dQmax" are absolute values indicative of the actual fuel-injection-rate.

The ECU 30 defines the injection rate model M in view of the parameters (each timing and the maximum injection rate) learned by the learning portion "L". While the fuel injection control is executed, the injection rate model M is used. The variation in the actual fuel pressure "Pc" and the actual fuel temperature "Th" of when the fuel-injection command signal is outputted are detected. These detection values are transmitted to the injection rate model M.

Figure 5:
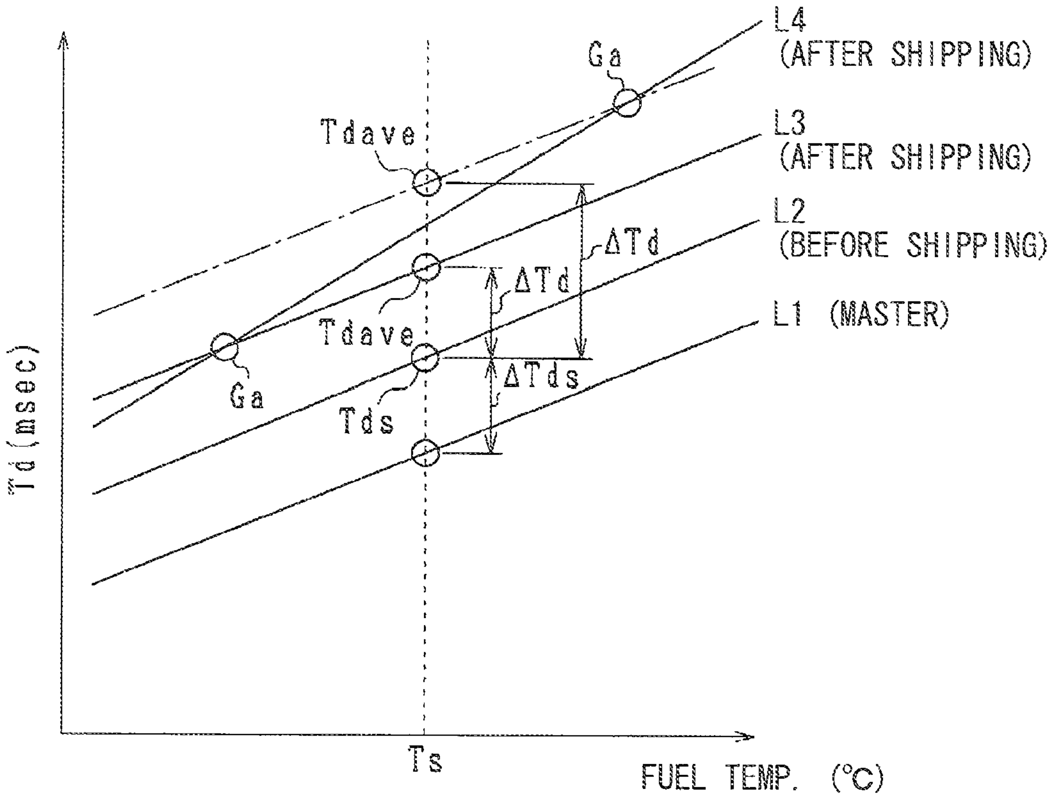
FIG. 5 is a graph showing characteristic formulas of a detected parameter Td.

Each of the parameters Td, Te, Rα, Rβ, and dQmax detected by the analyzing portion "AP" is an individual value for each fuel injector 10. In the present embodiment, before the fuel injection system is shipped, an experiment described below is conducted to obtain the parameters Td, Te, Rα, Rβ, and dQmax. These parameters are stored in a memory 23*a* mounted to the fuel injector 10 as the fuel-injection-characteristic value. It should be noted that these fuel-injection characteristics values depend on the fuel temperature. Thus, the experiment is conducted so that the fuel-injection characteristics values are obtained for each fuel temperature. FIG. 5 is a graph indicating the variation in the parameter relative to the fuel temperature, which is stored in the memory 23*a*.

Figure 4:
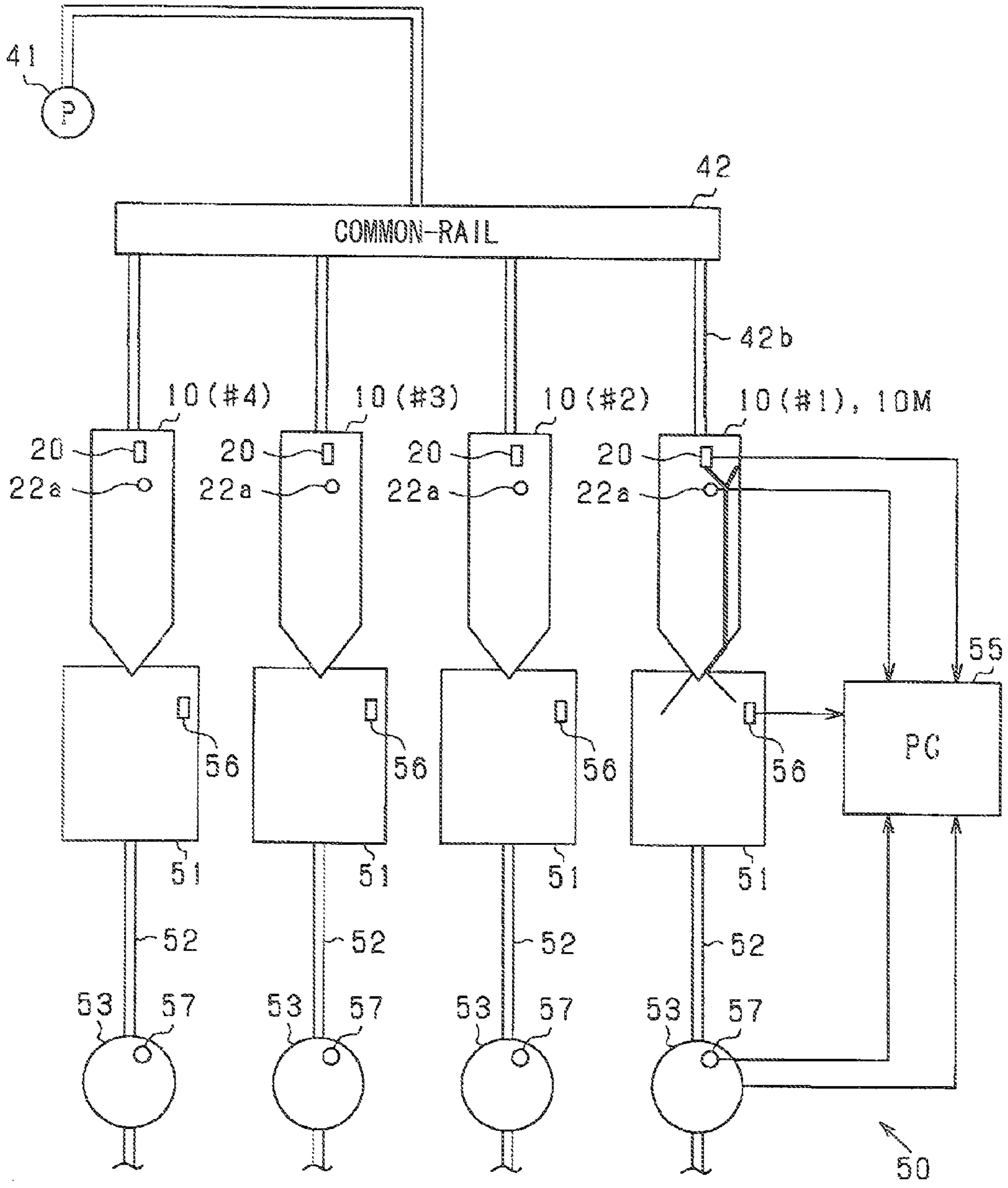
FIG. 4 is a schematic view showing a fuel injection property detecting apparatus.

FIG. 4 is a schematic view of a fuel injection property detecting apparatus (experimental device) 50 for obtaining the parameters Td, Te, Rα, Rβ, and dQmax. The experimental device 50 is provided with a pressure container 51, a guide pipe 52 and a flow meter 53 for each fuel injector 10.

Before mounting to the engine and shipping, the fuel injector 10 is connected to the pressure container 51. The pressure container 51 is a hollow container which is able to receive high-pressure fuel. The internal pressure of the pressure container 51 does not leak outside. The injection port 11*b* of the fuel injector 10 is arranged in the pressure container 51 so that the fuel is injected into the pressure container 51. The injected fuel flows down to a bottom portion of the pressure container 51. An upper end of the guide pipe 52 is connected to the bottom portion of the pressure container 51, and lower end of the guide pipe 52 is connected to the flow meter 53. The fuel in the bottom portion of the pressure container 51 is introduced into the flow meter 53 through the guide pipe 52.

The experimental device 50 is provided with a first experimental fuel pressure sensor 56 arranged in the pressure container 51, a second experimental fuel pressure sensor 20 provided to each fuel injector 10, a first experimental fuel temperature sensor 57 provided to each flow meter 53, a second experimental fuel temperature sensor 22*a* provided to each fuel injector 10, and an experimental personal computer (PC) 55. It should be noted that the second experimental fuel pressure sensor corresponds to the fuel pressure sensor 20 in FIG. 1, and the second experimental fuel temperature sensor 22*a* corresponds to the fuel temperature sensor 22*a* in FIG. 1.

The first experimental fuel pressure sensor 56 arranged in the pressure container 51 detects an internal pressure of the pressure container 51. When the fuel injector 10 injects the fuel into the pressure container 51, the internal pressure of the pressure container 51 is varied. Thus, the first experimental pressure sensor 56 can detect a fuel pressure variation due to the fuel injection by the fuel injector 10.

The flow meter 53 can detect minute flow rate. The flow meter 53 detects volume flow rate of fluid passing through the flow meter 23. Specifically, the flow meter 53 detects volume flow rate of the fuel injected by the fuel injector 10.

The first experimental fuel temperature sensor 57 is arranged in the flow meter 53 to detect temperature of fuel passing through the flow meter 53. That is, when the flow meter 53 detects the fuel flow rate, the first experimental fuel temperature sensor 57 detects the fuel temperature. It should be noted that the first experimental fuel temperature sensor 57 may be arranged in the guide pipe 52.

The experimental personal computer 55 is a well-known computer having a CPU, a RAM, a ROM, a signal processing device, an input-output port, a power source circuit and the like.

The detection signals of the above sensors are provided to the PC 55. The PC 55 integrates the fuel flow rate detected by the flow meter 53 so that a volume of the fuel which has passed through the flow meter 53, that is, the volume of the fuel which has been injected by the fuel injector 14 are computed. As above, the flow meter 53 and the PC 55 correspond to a volume detecting portion which detects the volume of fuel contained in the pressure container 51.

Further, based on the outputs of the various sensors, the PC 55 converts the volume of fuel detected by the flow meter 53 into the volume of fuel injected by the fuel injector 10, and computes a relative injection rate of fuel injected by the fuel injector 10. Then, based on the variation in the relative injection rate and the converted volume of fuel, the PC 55 computes a relationship between the pressure detected by the pressure sensor 56 and the actual injection rate of fuel injected by the fuel injector 10. Further, the PC 55 computes a relationship between the fuel-injection command signal and the actual injection rate.

Figure 3D:
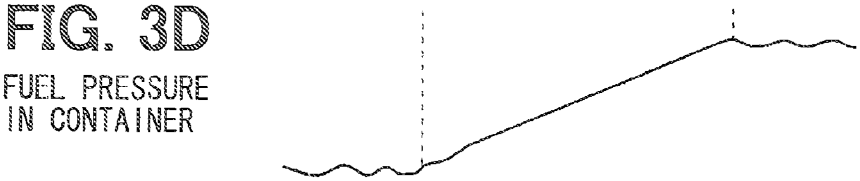

Further, when the fuel injector 10 injects the fuel, the pressure sensor 56 detects the fuel pressure which is shown in FIG. 3D. The pressure in the pressure container 51 increases according to the volume of fuel injected by the fuel injector 10.

The present inventors found out that a pressure increase quantity in the pressure container 51 and the volume of fuel injected into the pressure container 51 have a proportionality relation. The differentiation value of the pressure in the pressure container 51 and the differentiation value of the fuel volume have a proportionality relation. Thus, a variation in the differentiation value of pressure represents a relative variation in the injection rate, that is, the relative injection rate (refer to FIG. 3B).

Since an integrated value of the relative injection rate represents a volume of fuel, the relative injection rate is converted into the actual injection rate by applying the volume of fuel detected by the flow meter 53. At this time, the temperature of fuel passing through the flow meter 53 is different from the temperature of fuel injected by the fuel injector 10. The volume of fuel varies according to its temperature. Thus, if the volume of fuel detected by the flow meter 53 is applied to the integrated value of the relative injection rate, it is likely that the obtained actual injection rate may be inaccurate.

According to the present embodiment, based on the detection value of the temperature sensor 57 and the detection value of the temperature sensor 22*a*, the volume of fuel detected by the flow meter 53 is converted into the volume of fuel injected by the fuel injector 10. This converted volume of fuel is applied to the integrated value of the relative injection rate so that the relative injection rate is converted into the actual injection rate. Therefore, the relationship between the pressure detected by the pressure sensor 20 and the actual injection rate is accurately obtained. Further, the relationship between the pressure detected by the pressure sensor 56 and the actual injection rate is accurately obtained.

Each of the parameters is learned in association with the fuel temperature according to a following procedure. In the following description, it is explained that the fuel-injection-start time delay "Td" is learned. The other parameters Te, Rα, Rβ, dQmax are also learned in the same manner.

FIG. 5 shows a characteristic formula showing a relationship between the parameter "Td" and the fuel temperature. This characteristic formula is a linear function in which the parameter "Td" increases as the fuel temperature is higher.

First, with respect to a master fuel injector 10M as a test object, the fuel temperature is varied and a plurality of parameters "Td" are obtained by means of the experimental device 50. According to the method of least square based on the detected parameter "Td", a characteristic formula L1 representing a relation between the fuel temperature and the parameter "Td" is computed. A reference fuel temperature Ts is defined, for example, at 40° C.

Then, with respect to another fuel injector 10 other than the master fuel injector 10M, the parameter "Td" at the reference fuel temperature Ts is detected by means of the experimental device 50. At the reference fuel temperature Ts, the parameter "Td" of the master fuel injector 10M and the parameter "Td" of another fuel injector 10 are compared with each other to obtain a difference ΔTds therebetween. Then, based on the difference ΔTds, the characteristic formula L1 is corrected so that another characteristic formula L2 is computed with respect to another fuel injector 10. Specifically, the inclinations of the characteristic formulas (linear lines) L1 and L2 are equal to each other. The linear line L1 is offset by the difference ΔTds to obtain the linear line L2.

This linear line (characteristic formula) L2 is stored in the memory 23*a* or other memory of the ECU 30. After shipped, the parameter "Td" corresponding to the current fuel temperature is computed according to the stored formula L2. This computed parameter "Td" is reflected on the fuel-injection-rate model M. Since the parameter "Td" varies due to an aged deterioration of the fuel injector 10, the characteristic formula L2 is learned and successively updated as shown by formulas L3 and L4 in FIG. 5.

After the fuel injector 10 is shipped, the characteristic formula L2 is learned as follows.

Figure 6:
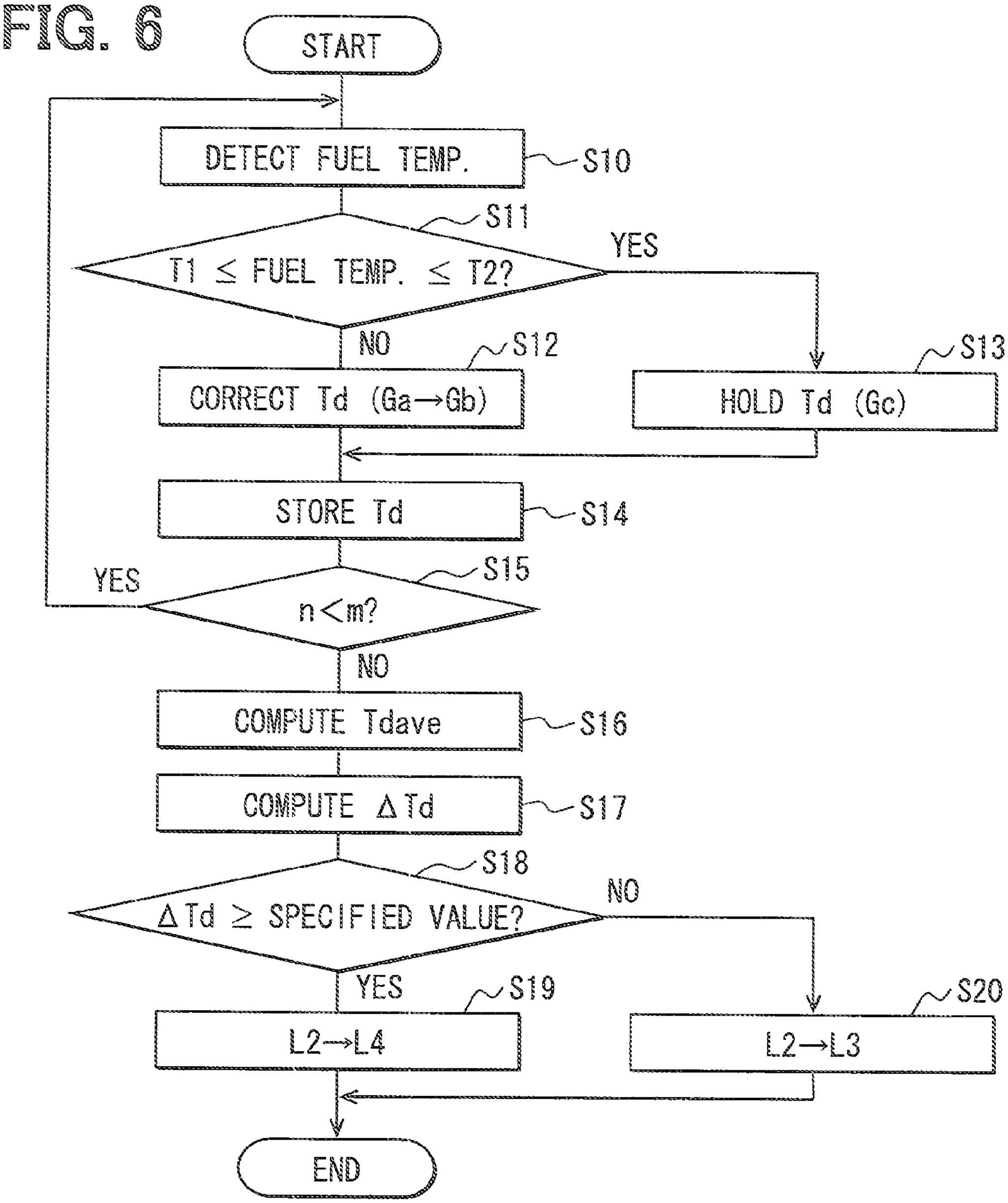
FIG. 6 is a flowchart showing a processing for learning a detected parameter Td.

FIG. 6 is a flow chart showing a learning processing of the characteristic formula, which is repeatedly executed at specified time intervals. In step S10, a current fuel temperature is obtained from the fuel temperature sensor 22*a*. In step S11, it is determined whether the obtained fuel temperature is within a specified range (T1-T2). The above reference temperature Ts is included in this specified range (T1-T2).

Figure 7:
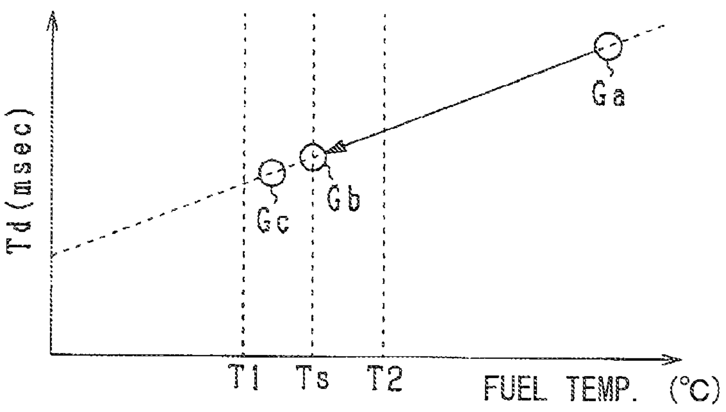
FIG. 7 is a graph for explaining a method for correcting the detected parameter Td based on a reference fuel temperature Ts.

When the answer is NO in step S11, the procedure proceeds to step S12 (correcting portion) in which the computed parameter "Td" is corrected as follows. A reference "Ga" in FIG. 7 denotes a value of the parameter "Td" of a case that the fuel temperature obtained in step S10 is higher than T2. In such a case, the value "Ga" of the parameter "Td" is converted into a value "Gb" at the reference fuel temperature Ts. For example, according to the inclination of the characteristic formula L2 of before learning, the value "Ga" is corrected to the value "Gb".

When the answer is YES in step S11, the procedure proceeds to step S13 in which the computed parameter "Td" is used as the parameter "Td" corresponding to the reference fuel temperature Ts. A reference "Gc" in FIG. 7 denotes a value of the parameter "Td" of a case that the fuel temperature obtained in step S10 is within the specified range (T1-T2). In such a case, the value "Gc" of the parameter "Td" is not corrected and used as a value of the parameter "Td" at the reference fuel temperature "Ts".

In step S14, the corrected parameter "Td" having a value of "Gb" or the computed parameter "Td" having a value of "Gc" is stored in a memory of the ECU 30 as the parameter "Td" corresponding to the reference fuel temperature Ts.

If the fuel temperature exceeds a specified upper limit, the liquid fuel turns to gas-liquid two-phase condition. If the fuel temperature falls below a specified lower limit, the liquid fuel is solidified. When the fuel is not liquid phase, it is preferable to prohibit the learning of the detected parameter. In the present embodiment, when the fuel temperature is higher than the upper limit or lower than the lower limit, it is prohibited that the detected parameter "Td" is stored in a memory in step S14. That is, the learning of the detected parameter "Td" is prohibited.

In step S15, it is determined whether a stored number "n" of the detected parameter "Td" is less than a specified number "m". Until the number "n" reaches the specified number "m", the procedure from step S10 to step S14 is repeatedly executed. When the number "n" becomes the number "m", the procedure proceeds to step S16. In step S16, an average of the detected parameters "Td" stored in the memory is computed as a learning value "Tdave".

In step S17, the computer computes a difference ΔTd between the learning value "Tdave" and the detected parameter "Tds" at the reference fuel temperature "Ts" on the characteristic formula L2. In step S18, the computer determines whether the difference ΔTd is greater than or equal to a specified value.

When the answer is NO in step S18, the procedure proceeds to step S20 (learning portion) in which the characteristic formula L2 is offset by the difference ΔTd so that the characteristic formula L3 is obtained. When the answer is YES in step S18, the procedure proceeds to step S19 (learning portion), an inclination of the characteristic formula L2 is corrected so that the characteristic formula L4 is obtained. For example, a plurality of parameters "Td"(Ga or Gc) before corrected in step S12 are obtained and a straight line is computed according to the method of least square based on the above parameters. This computed straight line is defined as the characteristic formula L4.

The learning procedure of the fuel-injection-start time delay "Td" is described above. The other parameters are also learned in association with the fuel temperature. Regarding the fuel-injection-start time delay "Td", as shown in FIG. 5, the fuel-injection-start time delay "Td" becomes longer as the fuel temperature is higher. With respect to the other parameters, as the fuel temperature is higher, any parameters become smaller.

According to the present embodiment, the injection characteristics values which the analyzing portion "AP" computes are stored as the characteristic formulas L2, L3 and L4 in association with the fuel temperature. Then, based on the stored characteristic formulas L2, L3 and L4, the fuel-injection-rate model "M" is established. Further, based on the fuel-injection-rate model "M" and the fuel temperature detected by the fuel temperature sensor 22*a*, the computer computes the command injection period "Tq" and the command injection-start time "Tc" corresponding to the required fuel injection quantity "Q" and the required fuel-injection-start time "T". Since the command injection period "Tq" and the command injection-start time "Tc" are computed based on the detected parameters Td, Te, Rα, Rβ, and dQmax, the actual fuel-injection-start time and the actual fuel injection quantity can be controlled with high accuracy.

Moreover, according to the present embodiment, a plurality of detected parameters "Td" corresponding to the reference fuel temperature Ts are stored and an average of the parameters is computed as the learning value "Tdave". Thus, the learning accuracy of the characteristic formula can be improved.

Although the relationship (characteristic formula) between the detected parameters Td, Te, Rα, Rβ, dQmax and the fuel temperature varies due to an individual dispersion and aged deterioration of the fuel injector 10, it is rare that the inclination of the characteristic formula L2 varies. The values of the detected parameters in entire range of the fuel temperature are entirely increased or decreased. In view of the above, according to the present embodiment, when the difference ΔTd is less than the specified value, the characteristic formula L2 is offset by the difference ΔTd so as to update the formula L2 into the formula L3. The characteristic formula L3 represents the relationship between the actual detected parameter "Td" and the fuel temperature with high accuracy.

Meanwhile, when the difference ΔTd is not less than the specified value, it is likely that the fuel property may be varied. In such a case, the inclination of the characteristic formula tends to vary. In view of the above, according to the present embodiment, when the difference ΔTd is not less than the specified value, the inclination of the unlearned characteristic formula L2 is computed based on a plurality of detected parameters "Td" so as to update characteristic formula L2 into the characteristic formula L4. The characteristic formula L4 represents the relationship between the actual detected parameter "Td" and the fuel temperature with high accuracy.

[Other Embodiment]

The present invention is not limited to the embodiments described above, but may be performed, for example, in the following manner. Further, the characteristic configuration of each embodiment can be combined.

The fuel temperature sensor 22*a* may be provided to the high-pressure pipe 42*b* or the common-rail 42.

Also, the fuel pressure sensor 20 may be provided to the high-pressure pipe 42*b* downstream of the outlet 42*a* of the common-rail 42.

The fuel-injection characteristics values can be stored in association with the fuel temperature and the fuel pressure in the common-rail 42.

The present invention can be applied to a direct injection engine having a delivery pipe in which fuel is accumulated.

What is claimed is:

1. A system comprising:

a fuel injector for injecting the high-pressure fuel accumulated in a accumulator through a fuel injection port;

a memory for storing a fuel-injection-characteristic value which the fuel injector individually has;

a fuel pressure sensor provided in a fuel passage fluidly connecting the accumulator and the fuel injection port, the fuel pressure sensor being configured to detect a fuel pressure in the fuel passage;

a fuel temperature sensor for detecting a fuel temperature;

an electronic control unit (ECU) configured to:

generate a fuel-injection command signal based on the fuel-injection-characteristic value;

analyze a fuel injection condition based on a fuel pressure waveform which represents a variation in a detection value of the fuel pressure sensor, the fuel-injection-characteristic value being detected based on the analyzed fuel injection condition;

store the fuel-injection-characteristic value in the memory in association with the fuel temperature detected by the fuel temperature sensor; wherein the memory stores a characteristics formula representing a relationship between the fuel-injection characteristic value and the fuel temperature;

the electronic control unit is further configured to update the characteristics formula based on the detected fuel-injection-characteristic value;

when a difference between the detected fuel-injection-characteristic value and an unlearned fuel-injection-characteristic value stored in the memory is less than a specified value, the electronic control unit updates the characteristics formula into a characteristics formula which is offset by the difference;

when the difference between the detected fuel-injection-characteristic value and the unlearned fuel-injection-characteristic value stored in the memory is not less than the specified value, the electronic control unit updates the characteristics formula into a characteristics formula of which inclination is varied according to the difference; and the electronic control unit is further configured to compute the fuel-injection-characteristic value according to the characteristics formula.

2. The system according to claim 1, wherein:

the electronic control unit is further configured to correct the fuel-injection-characteristic value corresponding to a current fuel temperature into a fuel-injection-characteristic value corresponding to a reference fuel temperature in a case that the current fuel temperature detected by the fuel temperature sensor is outside of a specified temperature range, the reference fuel temperature being within the specified temperature range, wherein the electronic control unit is further configured to store the corrected fuel-injection-characteristic value in the memory in association with the reference fuel temperature.

3. The system according to claim 1, wherein when the fuel temperature detected by the fuel temperature sensor exceeds a specified upper limit value or falls below a specified lower limit value, it is prohibited that the fuel-injection-characteristic value corresponding to the fuel temperature is stored in the memory.

* * * * *